United States Patent
Scherer et al.

(10) Patent No.: US 10,561,067 B2
(45) Date of Patent: Feb. 18, 2020

(54) TUBULAR FOR PROCESSING CROPS

(71) Applicant: Deere & Company, Moline, IL (US)

(72) Inventors: Robert A. Scherer, Sioux Falls, SD (US); James A. Scherer, Crooks, SD (US); Jason Schiebout, Sioux Falls, SD (US); Lyndon Luckasson, Tea, SD (US)

(73) Assignee: Deere & Company, Moline, IL (US)

( * ) Notice: Subject to any disclaimer, the term of this patent is extended or adjusted under 35 U.S.C. 154(b) by 212 days.

(21) Appl. No.: 15/626,743

(22) Filed: Jun. 19, 2017

(65) Prior Publication Data

US 2018/0359925 A1   Dec. 20, 2018

(51) Int. Cl.

| A01D 82/02 | (2006.01) |
|---|---|
| B02C 4/30 | (2006.01) |
| A01F 12/22 | (2006.01) |
| A01F 12/26 | (2006.01) |
| A01F 7/02 | (2006.01) |
| A01D 43/10 | (2006.01) |
| A01D 41/00 | (2006.01) |
| A01F 7/00 | (2006.01) |

(52) U.S. Cl.
   CPC ............. *A01D 82/02* (2013.01); *A01D 43/10* (2013.01); *A01F 7/02* (2013.01); *A01F 12/22* (2013.01); *A01F 12/26* (2013.01); *B02C 4/30* (2013.01); *A01D 41/00* (2013.01); *A01F 7/00* (2013.01)

(58) Field of Classification Search
   CPC ........ A01D 82/00; A01D 82/02; A01D 43/10; A01F 7/02; A01F 7/04; A01F 12/22; B02C 4/30; B02C 4/305
   See application file for complete search history.

(56) References Cited

U.S. PATENT DOCUMENTS

| 703,592 | A | * | 7/1902 | Jones | A01F 11/06 460/33 |
|---|---|---|---|---|---|
| 3,712,034 | A | * | 1/1973 | Praca | A01D 82/02 56/16.4 C |
| 5,451,184 | A | * | 9/1995 | Mietzel | A01F 11/06 460/32 |
| 6,050,070 | A | | 4/2000 | Cook | |
| 6,499,283 | B1 | | 12/2002 | Cook | |
| 8,480,019 | B1 | | 7/2013 | Scherer et al. | |

(Continued)

FOREIGN PATENT DOCUMENTS

| EP | 0995352 A1 * | 4/2000 | ............ A01D 82/02 |
|---|---|---|---|
| EP | 1516523 A1 | 3/2005 | |

OTHER PUBLICATIONS

Unpublished U.S. Appl. No. 15/280,088, filed Sep. 29, 2016, first named inventor Robert A. Scherer.

*Primary Examiner* — Alicia Torres
(74) *Attorney, Agent, or Firm* — Kilpatrick Townsend & Stockton LLP (57) ABSTRACT

A tubular for processing crops can include a body having an outer surface and protrusions extending outwardly from the outer surface. The protrusions can be arranged in bands that are spaced apart along the outer surface to define gaps therebetween that form grooves extending around a circumference of the body. Each band of protrusions can be positioned offset with respect to at least one adjacent band of protrusions such that the protrusions form a spiraling configuration around a longitudinal axis of the body.

20 Claims, 8 Drawing Sheets

(56) References Cited

U.S. PATENT DOCUMENTS

| | | |
|---|---|---|
| 9,486,806 B1 | 11/2016 | Scherer et al. |
| 9,918,432 B2 | 3/2018 | Horning, Jr. et al. |
| 2017/0000031 A1* | 1/2017 | Horning, Jr. .............. B02C 4/30 |

* cited by examiner

TUBULAR FOR PROCESSING CROPS

FIELD OF THE DISCLOSURE

The present disclosure relates generally to crop threshing or separating. More specifically, but not by way of limitation, this disclosure relates to a tubular for processing crops.

BACKGROUND

A harvester, such as a forage harvester, can be used to gather crops from a field. The gathered crops can then be processed in a manner that facilitates the formation of silage, animal feed, or other materials. For example, the gathered crops may be cut or crushed to improve the nutritional quality or digestibility of a resulting animal feed.

SUMMARY

One example of the present disclosure includes a tubular with a body having an outer surface. The tubular also includes protrusions extending outwardly from the outer surface to process crops. The protrusions can be arranged in bands that are spaced apart along the outer surface to define gaps therebetween that form parallel grooves extending around a circumference of the body. Each band of protrusions can be positioned offset with respect to at least one adjacent band of protrusions such that the protrusions form a spiraling configuration around a longitudinal axis of the body.

In another example, a harvester can include a frame configured to support the harvester. The harvester can also include a cutting assembly coupled to the frame. The cutting assembly can be configured to cut crops and provide crop segments to a conveyor assembly. The harvester can further include a crop-processing machine coupled to the frame. The crop-processing machine being configured to receive the crop segments from the conveyor assembly and process the crop segments by rotating at least one tubular. The at least one tubular can include a body having an outer surface. The at least one tubular can also include protrusions extending outwardly from the outer surface. The protrusions can be arranged in bands that are spaced apart along the outer surface to define gaps therebetween that form parallel grooves extending around a circumference of the body. Each band of protrusions can be positioned offset with respect to at least one adjacent band of protrusions such that the protrusions form a spiraling configuration around a longitudinal axis of the body.

Another example of the present disclosure includes a method to be implemented by a crop-processing machine. The method includes rotating at least one tubular. The at least one tubular can include a body having an outer surface. The at least one tubular can also include protrusions extending outwardly from the outer surface. The protrusions can be arranged in bands that are spaced apart along the outer surface to define gaps therebetween that form parallel grooves extending around a circumference of the body. Each band of protrusions can be positioned offset with respect to at least one adjacent band of protrusions such that the protrusions form a spiraling configuration around a longitudinal axis of the body. The method can also include feeding crops into the gaps and along the protrusions of the rotating tubular. The method can also include shearing and crushing the crops to produce kernels of the crops.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DETAILED DESCRIPTION

Certain aspects and features of the present disclosure relate to a tubular that can form part of a crop-processing machine (e.g., a kernel processor). The tubular can have protrusions extending outwardly from an outer surface of the tubular and arranged in bands around the outer surface of the tubular. The protrusions can be, or can include, teeth. The bands of protrusions can be spaced apart from one another to form grooves extending around a circumference of the outer surface of the tubular. Each of the bands can be positioned with an offset with respect to at least one adjacent band such that the protrusions form a spiral configuration around a longitudinal axis of the tubular. This spiral configuration of protrusions can improve some or all of (i) the flow of crops through the crop-processing machine, (ii) the power consumption of the crop-processing machine, (iii) the ability of the tubular to process crops, and (iv) the lifespan of the tubular.

For example, the crop-processing machine can have two rotating tubes that can cut, crush, shear, or otherwise process crops fed between tubes. And at least one of the tubes can have the spiral configuration of protrusions discussed above. By incorporating the protrusions along the surface of the tubular, the tubular can more easily grip and pull the crops through the crop-processing machine, thereby improving the flow of crops through the crop-processing machine. This may also reduce the amount of electrical power required by the crop-processing machine to process the crops. And by arranging the protrusions in the spiral configuration, the tubular can more easily tear, grind, and otherwise process the crops. This may also improve the lifespan of the tubular, because the tubular can process the crops more easily than may otherwise be possible.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
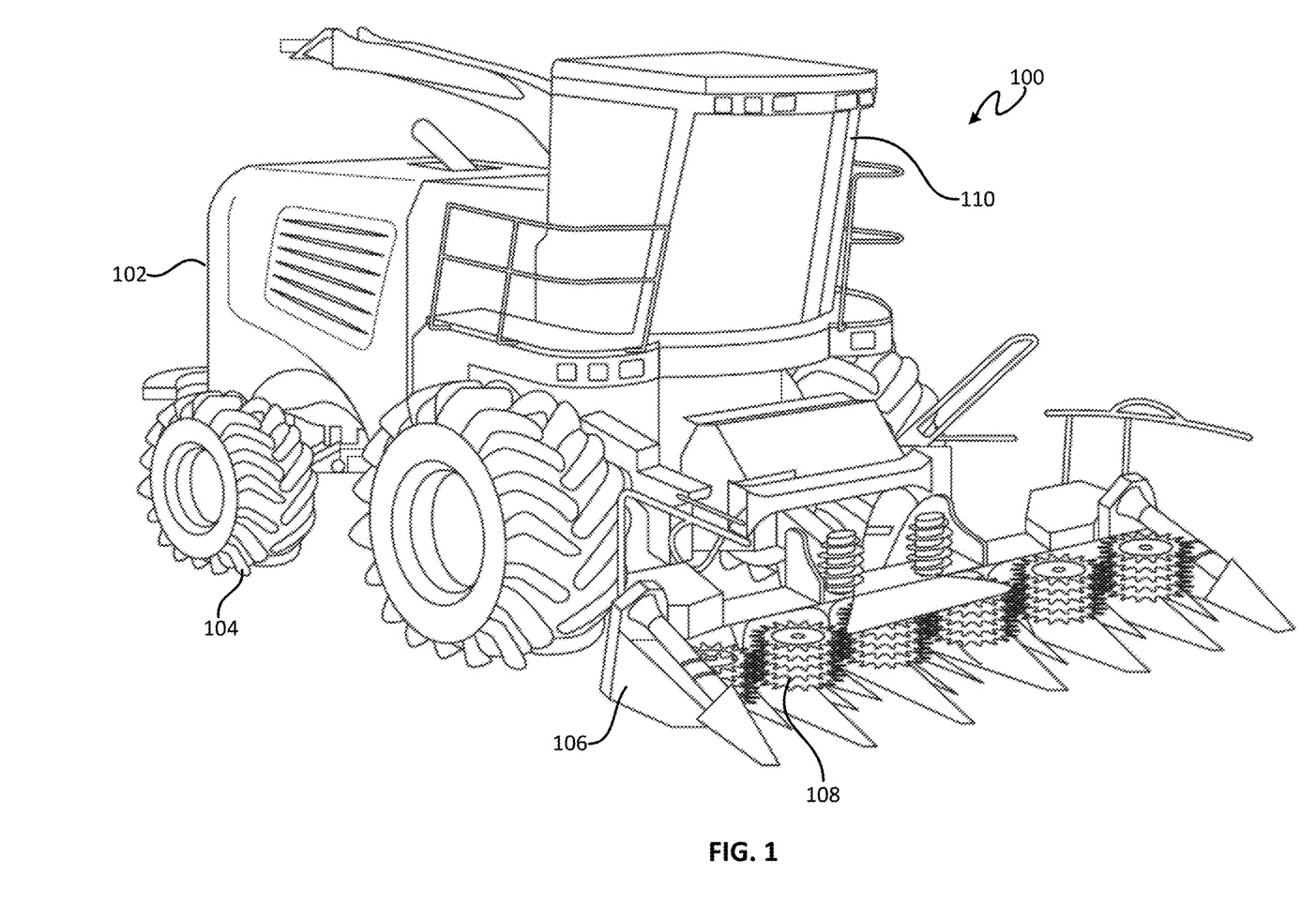
FIG. 1 is a perspective view of a harvester according to some aspects.

FIG. 1 is a perspective view of a harvester 100 according to some aspects. The harvester 100 can be, for example, a forage harvester for gathering forage or other crops from a field. The harvester 100 includes a frame 102, which can be formed from metal, plastic, or any other suitable material(s). The frame 102 can support the harvester 100 and provide general structure to the harvester 100. The harvester 100 also includes at least one ground engaging element, such as ground engaging element 104, to enable the harvester 100 to move. Examples of a ground engaging element can include a wheel, track, tire, or a combination of these. The ground engaging element (s) can be controlled by one or more input devices positioned in a cab 110 or elsewhere on the harvester 100. Examples of the input devices can include joysticks, buttons, wheels, or any combination of these.

The harvester 100 can also include a cutting assembly 106. The cutting assembly 106 can include one or more cutting tools 108 for cutting or otherwise harvesting crops. In the example shown in FIG. 3, the cutting tools 108 can rotate to cut crops positioned in a path of the harvester 100.

Figure 2:
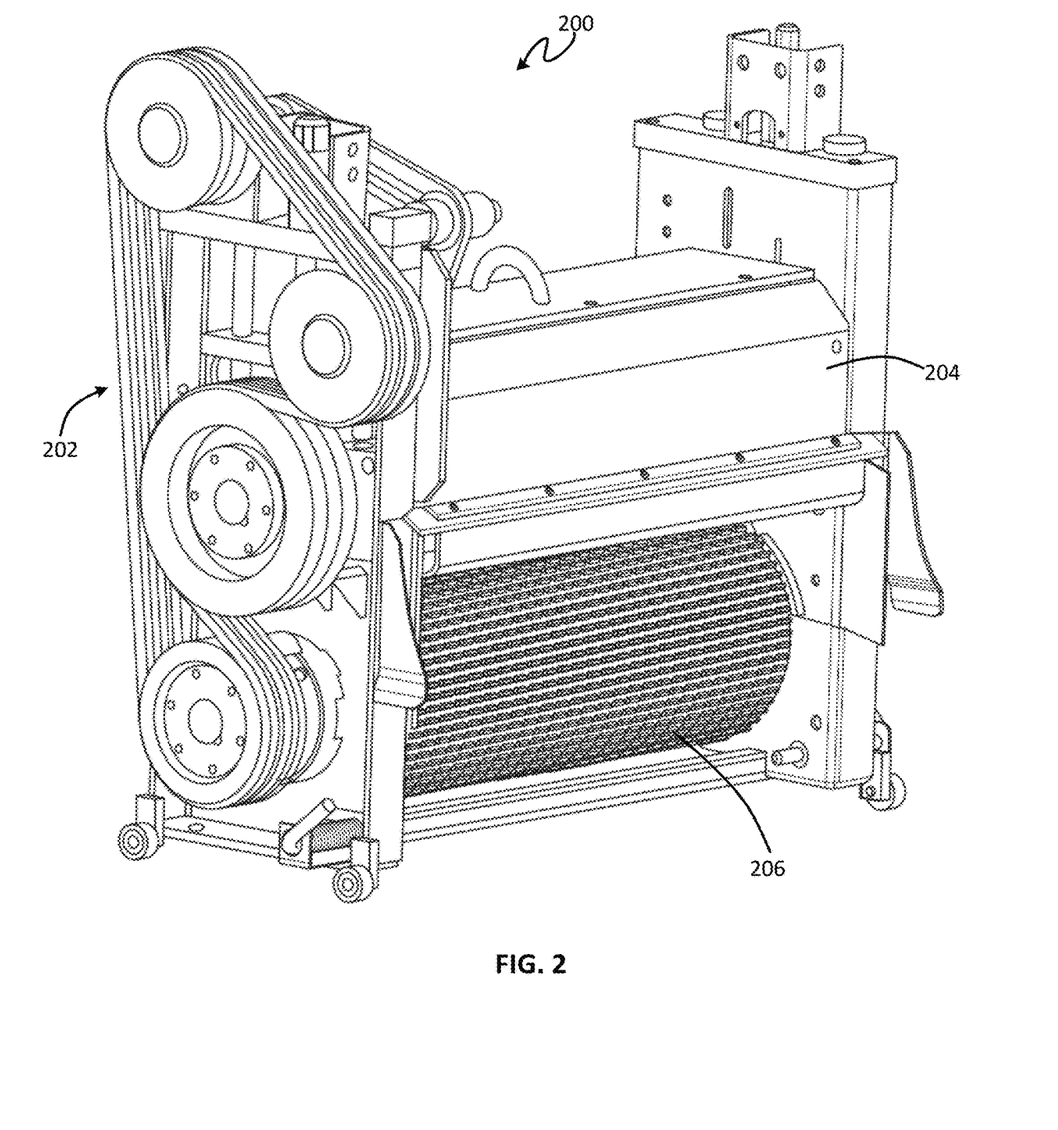
FIG. 2 is a perspective view of a crop-processing machine with a tubular according to some aspects.

The cutting assembly 106 can transfer the harvested crops to a conveyor assembly or other carrying medium for transmission to a crop-processing machine, such as crop-processing machine 200 shown in FIG. 2, which can be attached to our included in the harvester 100.

Referring now to FIG. 2, the crop-processing machine 200 can include a gear assembly 202. The gear assembly 202 can include one or more motors, rotatable gears, or both coupled together by one or more belts. The gear assembly 202 can rotate at least one tubular, such as tubular 206, to process crops that are fed across, or between, the tubular(s). Although in the example shown in FIG. 2 only one tubular 206 is visible, the crop-processing machine 200 may also include another tubular (e.g., hidden from view by cover plate 204). The gear assembly 202 can rotate the two tubes at the same speed or at different speeds to improve the processing of the crops. For example, the gear assembly 202 can rotate one tubular 10% faster than another tubular.

Figure 3A:
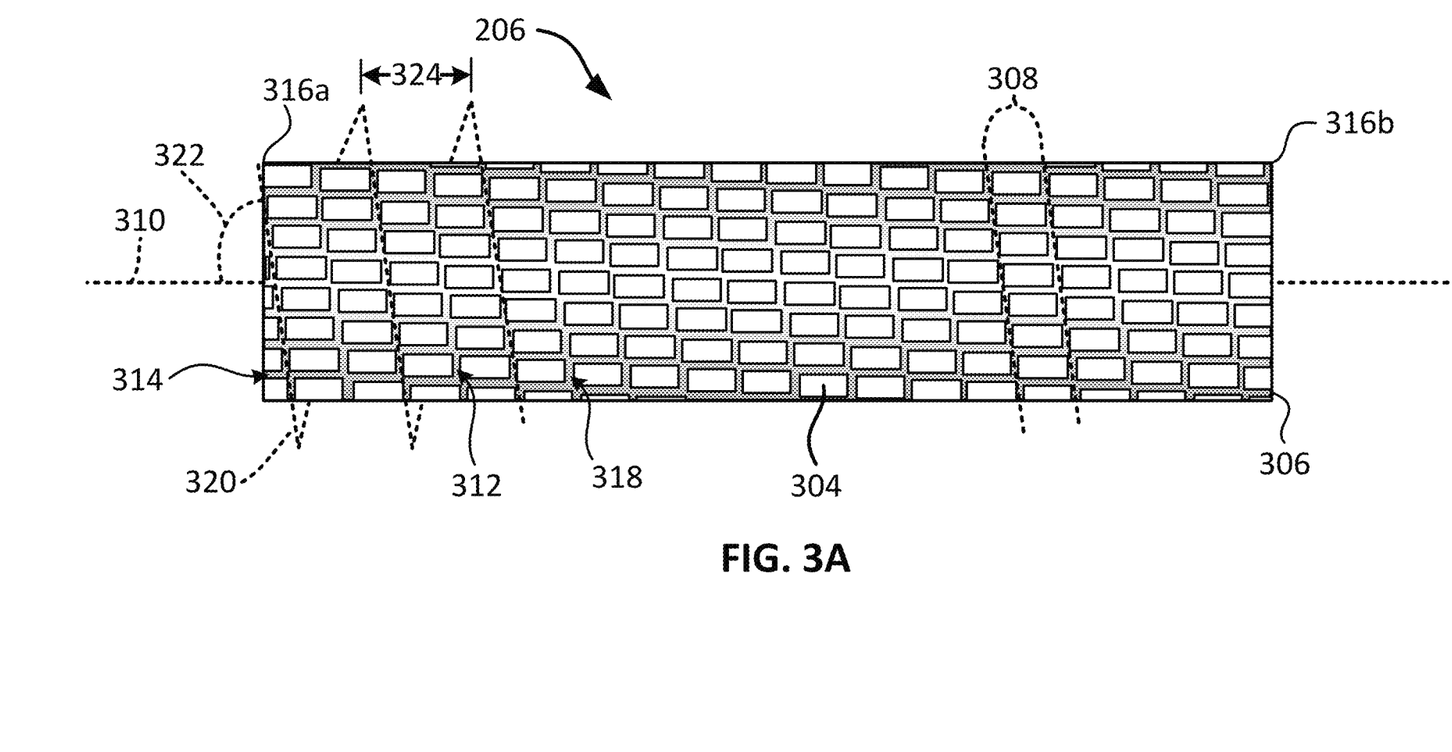
FIG. 3A is a side view of an example of a tubular for processing crops according to some aspects.

The tubular 206 includes multiple protrusions positioned across an outer surface of the tubular 206, as described in greater detail below with respect to FIG. 3. The protrusions can substantially cover the outer surface of the tubular 206. For example, the protrusions can cover between 75% and 95% of the outer surface of the tubular. In some examples in which the crop-processing machine 200 includes two or more tubes, the densities of the protrusions on the outer surfaces of the tubes can be different from one another. For example, the one tubular 206 can have one density of protrusions on its outer surface and another tubular can have a different density of the protrusions on its outer surface.

Figure 3B:
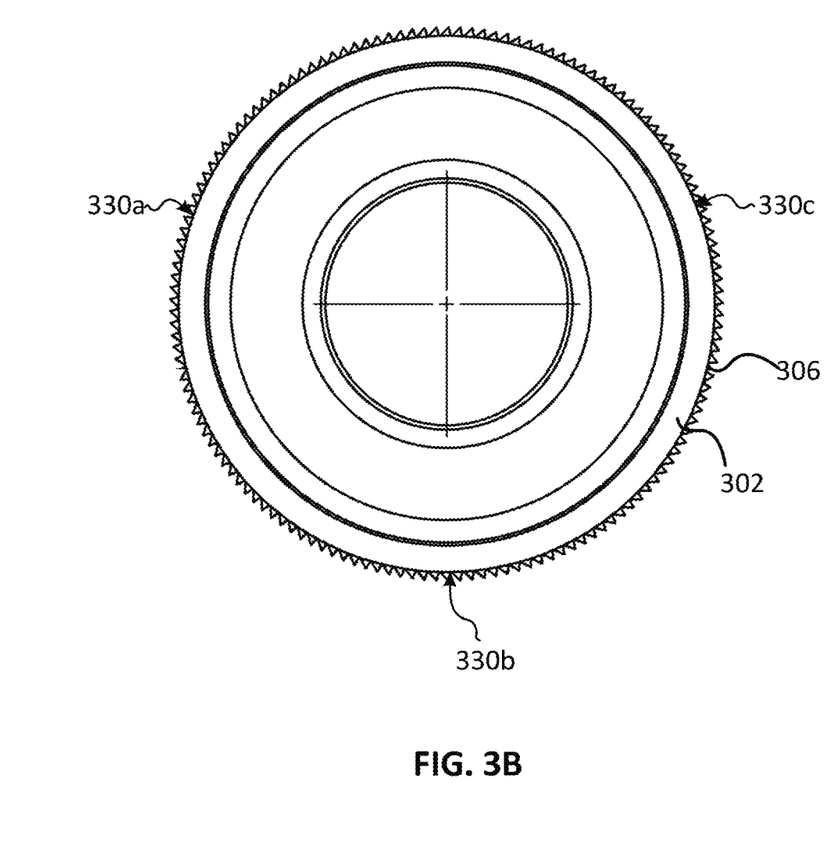
FIG. 3B is a cross-sectional end view of an example of the tubular of FIG. 3A according to some aspects.
Figure 3C:
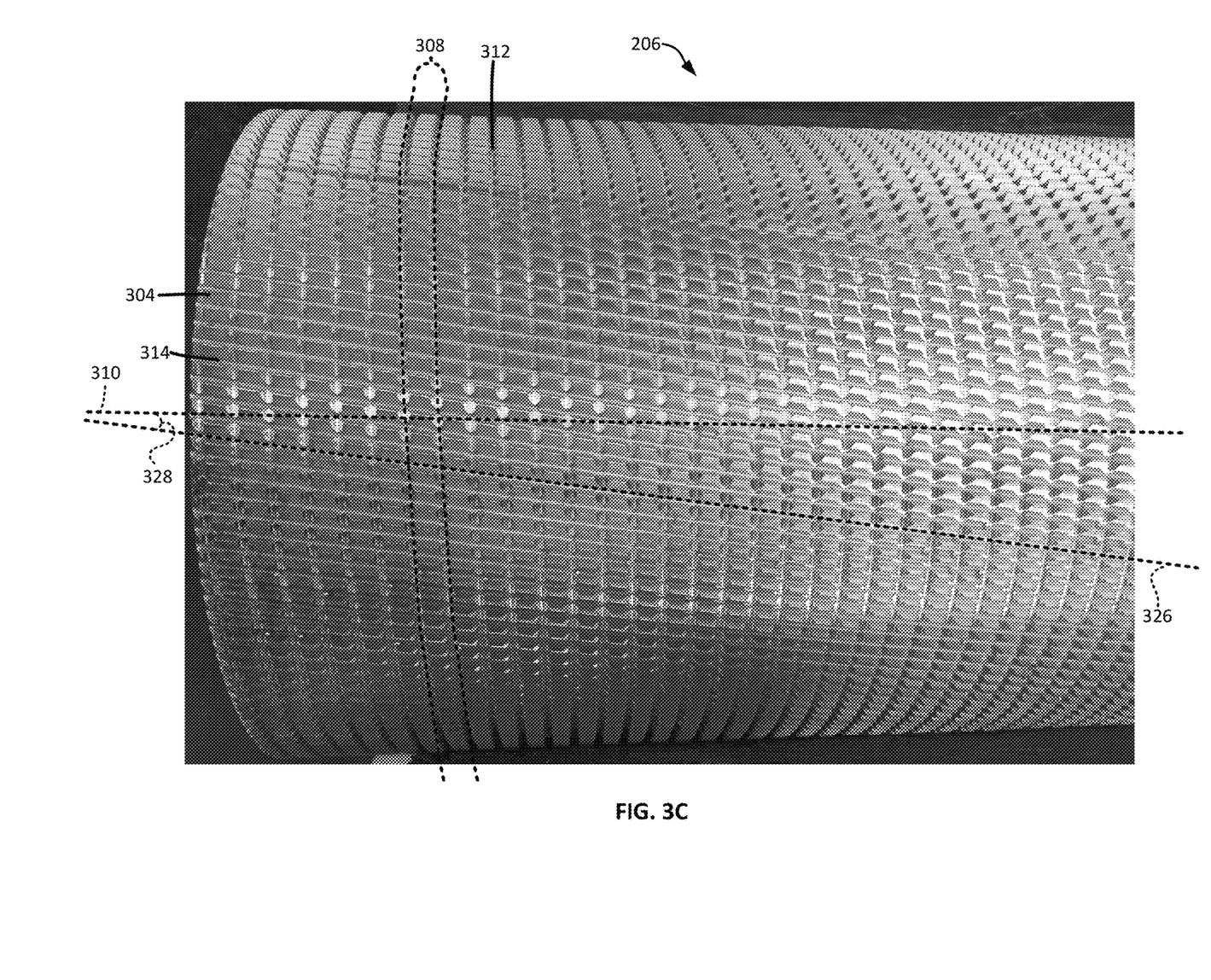
FIG. 3C is side view of an example of a portion of the tubular of FIG. 3A according to some aspects.

FIGS. 3A-C are views of an example of the tubular 206 of FIG. 2 according to some aspects. The tubular 206 includes a body 302 formed from metal, plastic, or any other suitable material or combination of materials. The body 302 can have a cylindrical shape. An outer surface 306 of the body 302 can include protrusions, such as protrusion 304. The protrusions can be formed from metal, plastic, cement, or any other suitable material or combination of materials.

The protrusions can be arranged in bands, such as band 308, around the outer surface 306 of the tubular 206. Spacing between the bands can define gaps, such as gap 312. The gaps between the bands can be between 0.1 inches and 0.25 inches. Gaps in this size range can improve the lifespan of the tubular 206. For example, gaps that are smaller than this 0.1 inches may result in the protrusions being spaced too closely together, which may result in the protrusions wearing out (e.g., becoming dull) faster and processing crops less effectively. Gaps that are larger than 0.25 inches may enable crops to become stuck or hidden in the gaps, which may result in the tubular 206 processing the crops less effectively.

The gaps can define circumferential grooves, such as groove 318, extending around a circumference of the body 302. The circumferential grooves can form a spiral shape or helical shape, as depicted by dashed line 320, around the circumference of the body 302. This can be referred to as a circumferential helix. The circumferential helix can extend from one end 316a of the tubular 206 to an opposite end 316b of the tubular. The circumferential helix can be at any suitable angle 322 with respect to a longitudinal axis 310 of the tubular 206. For example, the circumferential helix can be at an angle 322 of between 30 degrees and 89.5 degrees with respect to the longitudinal axis 310. In some examples, the circumferential groove can move a distance 324 of between 1 inch and 2 inches along the longitudinal axis 310 of the tubular each time it wraps around the tubular 206 to form the circumferential helix.

There can be any number of circumferential helixes extending along the longitudinal length of the tubular 206. In the example shown in FIG. 3B, the tubular 206 includes three circumferential helixes, each spaced 120 degrees apart around the cross-sectional end of the tubular 206 and starting at points 330a, 330b, and 330c.

In some examples, the spacing between the protrusions can also define longitudinal grooves, such as longitudinal groove 314, extending along a longitudinal length of the body 302. Each band of protrusions can each be offset with respect to at least one adjacent band to create a spiraling of the longitudinal grooves around the outer surface 306 of the body 302. This can be referred to as a longitudinal spiral. For example, the bands of protrusions can be arranged to create longitudinal grooves (or rows of protrusions) that start at one end 316a of the tubular 206 and wind in a clockwise or counter clockwise direction around the outer surface 306 and along the longitudinal axis 310 of the tubular 206 until reaching the other end 316b of the tubular 206. An example of such a longitudinal spiral is shown by dashed line 326 in FIG. 3C. The longitudinal spiral can be at any suitable angle 328 with respect to the longitudinal axis 310. For example, the longitudinal spiral can be at an angle 328 that is between 0.5 degrees and 12 degrees from the longitudinal axis 310.

In some examples, the crop-processing machine 200 can include two tubulars 206 that have longitudinal grooves that wind in the same direction (e.g., the clockwise direction) around the tubulars 206. By having the longitudinal grooves wind in the same direction around the tubulars 206, an "X" or chevron pattern can be generated at the surface between the tubulars 206 (through which the crop pass), which can improve the ability of the crop-processing machine 200 to process the crops.

Figure 4A:
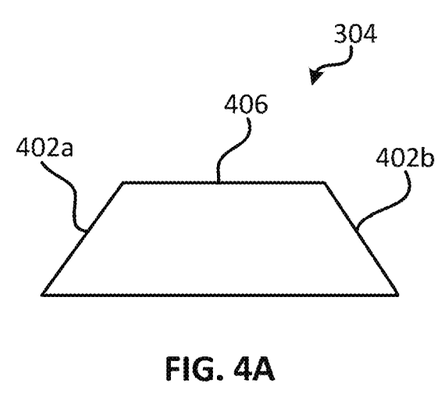
FIG. 4A is a cross-sectional view of an example of a protrusion according to some aspects.
Figure 4B:
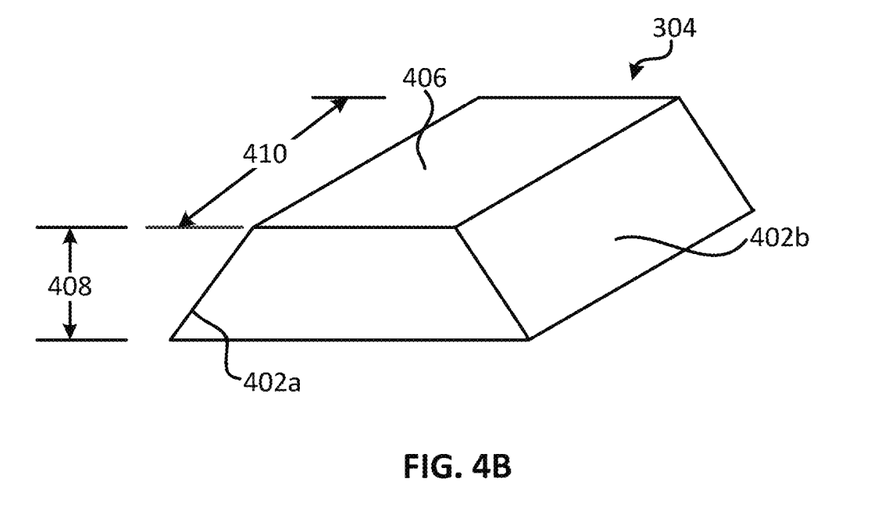
FIG. 4B is a perspective view of an example of the protrusion of FIG. 4A according to some aspects.

The protrusions of the tubular 206 can be sharp for cutting crops passing along the tubular 206, blunt for crushing crops passing along the tubular 206, or both of these. One example of a protrusion 304 is shown in FIGS. 4A-B. In the example shown in FIG. 4A, the cross-sectional shape of the protrusion 304 includes a truncated triangle shape. The truncated triangle shape can include at least two sloping edges 402a-b protruding away from the outer surface of the tubular. The two sloping edges 402a-b may be sharp and form a cutting surface. A flat region 406 can be positioned between the sloping edges 402a-b. The flat region 406 may be blunt and form a crushing surface.

The protrusion 304 can have any suitable height 408 and longitudinal length 410. For example, the protrusion 304 can have a height 408 that is between 2 millimeters (mm) and 6 mm. The protrusion 304 can have a longitudinal length 410 that is between 4 mm and 8 mm. Some examples that include protrusions with the abovementioned dimensions can process crops better than protrusions having other dimensions. For example, protrusions that have a longitudinal length 410 that is longer than 8 mm may not be aggressive enough, which may cause problems with crop flow through the crop-processing machine.

Figure 5:
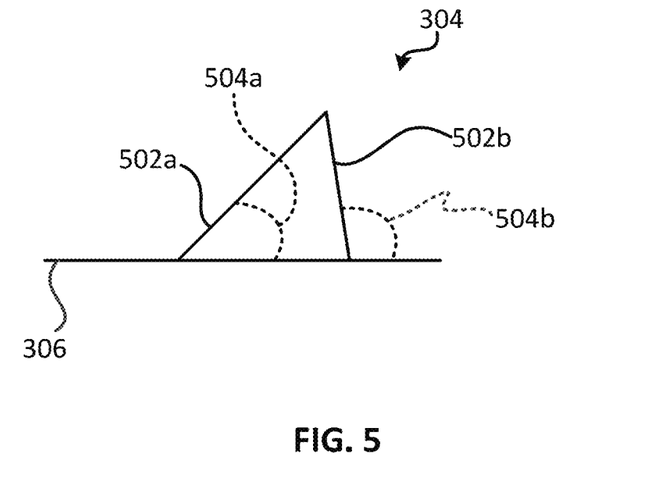
FIG. 5 is a cross-sectional view of another example of a protrusion according to some aspects.

Another example of the protrusion 304 is shown in FIG. 5. In this example, the protrusion 304 has a saw-tooth cross-sectional shape formed from two sloped edges 502a-b. Sloped edges 502a-b can be at angles 504a-b with respect to the outer surface 306 of the tubular. The angle 504a can be between 35 degrees and 60 degrees with respect to the outer surface 306. The angle 504b can be between 90 degrees and 110 degrees with respect to the outer surface 306. Protrusions having the abovementioned angles may more aggressively cut crops, resulting in improved crop-processing. But any suitable combination of angles 502a-b can be used.

Although the examples of FIGS. 4-5 describe the protrusion 304 as having a truncated triangle shape and a saw-tooth shape, in other examples the protrusion 304 can include another shape, such as a triangular shape, pyramid shape, truncated pyramid shape, rectangular shape, saw-tooth shape, square shape, oval shape, or any combination of these. The tubular 206 can include any number and combination of protrusions having any number and combination of shapes. And each of these shapes may be specifically chosen to process the crops into a particular texture, size, shape, or any combination of these.

Figure 6:
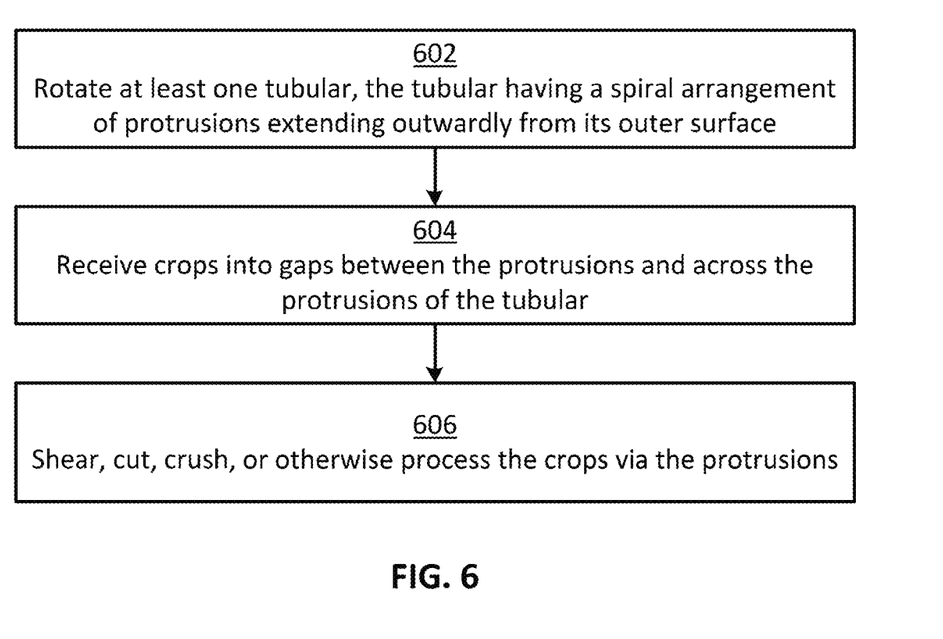
FIG. 6 is a flow chart of an example of a process for using a crop-processing machine to process crops according to some aspects.

FIG. 6 is a flow chart of an example of a process for using a crop-processing machine to process crops according to some aspects. Some examples can be implemented using more steps, fewer steps, different steps, or a different order of the steps depicted in FIG. 6. The steps below may be implemented by the crop-processing machine 200 discussed above.

In block 602, the crop-processing machine 200 rotates at least one tubular 206. The crop-processing machine 200 can rotate the tubular 206 by actuating a gear assembly 202 or a motor. The tubular 206 can have protrusions, such as protrusion 304, extending outwardly from the outer surface 306 and forming a spiral arrangement around the outer surface 306 of the tubular 206.

In block 604, the crop-processing machine 200 receives crops into the gaps 312 (and other spaces) between the protrusions and along the protrusions of the rotating tubular. For example, the crop-processing machine 200 can be coupled to a conveyor belt that feeds the crops between two rotating tubes that form a portion of the crop-processing machine 200.

In block 606, the tubular (or the protrusions of the tubular) can shear, cut, crush, or otherwise process the crops. For example, sharp surfaces of the protrusions can cut the crops while blunt surfaces of the protrusions crush the crops. This may produce kernels of the crops, or otherwise that facilitate the formation of silage, animal feed, or other materials from the crops.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A tubular comprising:
a body having an outer surface; and
protrusions extending outwardly from the outer surface to process crops, the protrusions being spaced apart on the outer surface to define longitudinal grooves extending from a first end of the body to a second end of the body, the longitudinal grooves defining rows of protrusions extending from the first end of the outer surface to the second end of the outer surface, each row of protrusions being oriented at an angle relative to a longitudinal axis of the body to form a longitudinal spiral around the longitudinal axis of the body,
wherein the protrusions each have a cross-sectional shape parallel to the longitudinal axis comprising sloping edges protruding away from the outer surface of the tubular.

2. The tubular of claim 1, wherein the protrusions are also spaced apart on the outer surface to define circumferential grooves extending around a circumference of the outer surface, the circumferential grooves defining columns of protrusions extending around the circumference of the outer surface, the columns of protrusions being slanted relative to the longitudinal axis to form circumferential helixes extending from the first end of the body to the second end of the body.

3. The tubular of claim 1, wherein the cross-sectional shape includes a triangular shape.

4. The tubular of claim 1, wherein the cross-sectional shape includes a truncated pyramid shape.

5. The tubular of claim 1, wherein the protrusions have a saw-tooth shape.

6. The tubular of claim 5, wherein the protrusions each have a cross-sectional shape perpendicular to the longitudinal axis comprising:
a first edge having a first angle of between 35 degrees and 60 degrees with respect to the outer surface; and
a second edge having a second angle of between 90 degrees and 110 degrees with respect to the outer surface.

7. The tubular of claim 1, wherein the angle is between 0.5 degrees and 12 degrees from the longitudinal axis.

8. The tubular of claim 1, wherein the tubular is included in a crop-processing machine of a harvester.

9. A harvester comprising:
a frame configured to support the harvester;
a cutting assembly coupled to the frame, the cutting assembly being configured to cut crops and provide crop segments to a conveyor assembly; and
a crop-processing machine coupled to the frame, the crop-processing machine being configured to receive the crop segments from the conveyor assembly and process the crop segments by rotating at least one tubular, the at least one tubular comprising:
a body having an outer surface; and
protrusions extending outwardly from the outer surface to process crops, the protrusions being spaced apart on the outer surface to define longitudinal grooves extending from a first end of the body to a second end of the body, the longitudinal grooves defining rows of protrusions extending from the first end of the outer surface to the second end of the outer surface, each row of protrusions being oriented at an angle relative to a longitudinal axis of the body to form a longitudinal spiral around the longitudinal axis of the body, wherein the protrusions each have a cross-sectional shape parallel to the longitudinal axis comprising sloping edges protruding away from the outer surface of the at least one tubular.

10. The harvester of claim 9, wherein the at least one tubular comprises two tubes and the crop-processing machine is configured to process the crops by feeding the crop segments between the two tubes while rotating the two tubes.

11. The harvester of claim 9, wherein the protrusions each have a flat region between the sloping edges.

12. The harvester of claim 9, wherein the protrusions have a saw-tooth shape.

13. The harvester of claim 9, wherein the protrusions each have a cross-sectional shape perpendicular to the longitudinal axis comprising:
 a first edge having a first angle of between 35 degrees and 60 degrees with respect to the outer surface; and
 a second edge having a second angle of between 90 degrees and 100 degrees with respect to the outer surface.

14. The harvester of claim 9, wherein the angle is between 0.5 degrees and 12 degrees from the longitudinal axis.

15. A method implemented by a crop-processing machine, the method comprising:
 rotating at least one tubular comprising:
  a body having an outer surface; and
  protrusions extending outwardly from the outer surface to process crops, the protrusions being spaced apart on the outer surface to define longitudinal grooves extending from a first end of the body to a second end of the body, the longitudinal grooves defining rows of protrusions extending from the first end of the outer surface to the second end of the outer surface, each row of protrusions being oriented at an angle relative to a longitudinal axis of the body to form a longitudinal spiral around the longitudinal axis of the body, wherein the protrusions each have a cross-sectional shape parallel to the longitudinal axis comprising sloping edges protruding away from the outer surface of the at least one tubular;
 receiving crops into gaps and along the protrusions of the rotating tubular; and
 shearing and crushing, by the protrusions, the crops to produce kernels of the crops.

16. The method of claim 15, wherein the at least one tubular comprises two tubes, rotating the at least one tubular comprises rotating the two tubes, and feeding the crops comprises feeding the crops between the two tubes while rotating a first tubular of the two tubes faster than a second tubular of the two tubes.

17. The method of claim 16, wherein the first tubular has the protrusions arranged in a first density on the outer surface of the first tubular, and the second tubular has the protrusions arranged in a second density on the outer surface of the second tubular, the second density being greater than the first density.

18. A tubular comprising:
 a body having an outer surface; and
 protrusions extending outwardly from the outer surface to process crops, the protrusions being spaced apart on the outer surface to define longitudinal grooves extending from a first end of the body to a second end of the body, the longitudinal grooves defining rows of protrusions extending from the first end of the outer surface to the second end of the outer surface, each row of protrusions being oriented at an angle relative to a longitudinal axis of the body to form a longitudinal spiral around the longitudinal axis of the body,
 wherein the protrusions each have a cross-sectional shape perpendicular to the longitudinal axis comprising:
  a first edge having a first angle of between 35 degrees and 60 degrees with respect to the outer surface; and
  a second edge having a second angle of between 90 degrees and 100 degrees with respect to the outer surface.

19. The tubular of claim 18, wherein the protrusions are also spaced apart on the outer surface to define circumferential grooves extending around a circumference of the outer surface, the circumferential grooves defining columns of protrusions extending around the circumference of the outer surface, the columns of protrusions being slanted relative to the longitudinal axis to form circumferential helixes extending from the first end of the body to the second end of the body.

20. The tubular of claim 18, wherein the protrusions each have a cross-sectional shape parallel to the longitudinal axis comprising sloping edges protruding away from the outer surface of the tubular.

\* \* \* \* \*